US011888350B2

(12) United States Patent
Pang et al.

(10) Patent No.: US 11,888,350 B2
(45) Date of Patent: Jan. 30, 2024

(54) STATOR, STATOR MANUFACTURING METHOD, MOTOR, AND ELECTRIC VEHICLE

(71) Applicant: Huawei Digital Power Technologies Co., Ltd., Shenzhen (CN)

(72) Inventors: Ji Pang, Shenzhen (CN); Di Li, Xi'an (CN); Lang Lv, Xi'an (CN); Chao Cao, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/680,616

(22) Filed: Feb. 25, 2022

(65) Prior Publication Data
US 2022/0209591 A1     Jun. 30, 2022

(30) Foreign Application Priority Data
Feb. 26, 2021  (CN) .......................... 202110217741.5

(51) Int. Cl.
*H02K 1/16* (2006.01)
*B60K 1/00* (2006.01)
*H02K 15/02* (2006.01)

(52) U.S. Cl.
CPC ............. *H02K 1/165* (2013.01); *B60K 1/00* (2013.01); *H02K 15/024* (2013.01)

(58) Field of Classification Search
CPC .... H02K 1/165; H02K 15/024; H02K 15/026; B60K 1/00
See application file for complete search history.

(56) References Cited

U.S. PATENT DOCUMENTS

| | | | |
|---|---|---|---|
| 5,804,896 A * | 9/1998 | Takehara | H02K 3/12 310/410 |
| 5,831,366 A * | 11/1998 | Kern | H02K 21/222 29/598 |
| 5,861,696 A * | 1/1999 | Hartman | H02K 21/22 310/156.19 |
| 10,763,709 B2 * | 9/2020 | Wang | H02K 15/024 |

(Continued)

FOREIGN PATENT DOCUMENTS

| | | |
|---|---|---|
| CA | 3131500 A1 | 6/2020 |
| CN | 205986369 U | 2/2017 |
| CN | 206135562 U | 4/2017 |

(Continued)

*Primary Examiner* — Leda T Pham
(74) *Attorney, Agent, or Firm* — Rimon PC (57) ABSTRACT

Embodiments of this application disclose a stator, a stator manufacturing method, a motor, and an electric vehicle. The stator includes: a stator tooth part, where a plurality of stator tooth parts are arranged at intervals along a circumferential direction; and a stator yoke part, where the stator yoke part is disposed along a circumferential direction of the stator tooth part, and the circumferential direction is a circumferential direction around a central axis of the stator; where the stator tooth part and the stator yoke part are integrally formed by an oriented silicon steel sheet, and a grain direction of the formed oriented silicon steel sheet points to the central axis of the stator along a radial direction. Therefore, the stator tooth part and the stator yoke part are formed by using one material, and there is no need to splice two materials, thereby reducing process costs.

13 Claims, 9 Drawing Sheets

(56) References Cited

U.S. PATENT DOCUMENTS

2013/0119816 A1\* 5/2013 Yang ................. H02K 1/24
310/216.007

FOREIGN PATENT DOCUMENTS

| CN | 108199505 A | 6/2018 |
|----|-------------|--------|
| CN | 109861411 A | 6/2019 |
| CN | 110048527 A | 7/2019 |
| CN | 209389790 U | 9/2019 |
| DE | 10340114 A1 | 3/2004 |
| JP | H10271716 A | 10/1998 |
| WO | 2013026966 A1 | 2/2013 |
| WO | 2015158256 A1 | 10/2015 |

\* cited by examiner

| Wind in the shape of a helix an elongated oriented silicon steel sheet around a central axis O and sequentially laminate and press the elongated oriented silicon steel sheet into a ring shape to form a stator — S101 |

| Wind in a shape of a helix an elongated oriented silicon steel sheet around an axial direction and sequentially laminate and press the elongated oriented silicon steel sheet to form a ring | S301 |

| Arrange a plurality of slots on the ring to form a stator | S302 |

STATOR, STATOR MANUFACTURING METHOD, MOTOR, AND ELECTRIC VEHICLE

CROSS-REFERENCE TO RELATED APPLICATION

This application claims priority to Chinese Patent Application No. 202110217741.5, filed on Feb. 26, 2021, which is hereby incorporated by reference in its entirety.

TECHNICAL FIELD

Embodiments of this application relate to the field of electric vehicles, and in particular, to a stator, a stator manufacturing method, a motor, and an electric vehicle.

BACKGROUND

A motor is a core driving component of a new energy vehicle, and usually accounts for 30% to 40% of the total mass of the vehicle. To reduce an energy loss of a new energy vehicle and increase a driving range, a lightweight new energy vehicle needs to be implemented. Therefore, a motor with a higher power density and better performance is needed.

An oriented silicon steel can be used as a new material in the motor. Performance is relatively good along a magnetic domain direction of the oriented silicon steel, an iron loss is less than that of a non-oriented silicon steel, and a magnetic field strength can be higher. Therefore, the oriented silicon steel can be used to improve performance of the motor and increase power density of the motor.

However, due to the impact of the magnetic domain direction, an oriented silicon steel sheet is currently used only in a stator tooth part of the motor, while a stator yoke part uses a non-oriented silicon steel. During processing, the stator tooth part and the stator yoke part need to be formed separately and spliced together, and therefore a processing process is complex, and costs are relatively high.

SUMMARY

Embodiments of this application provide a stator, a stator manufacturing method, a motor, and an electric vehicle, so as to resolve a problem that a stator processing technology is complex and costs are high.

To achieve the foregoing objective, the embodiments of this application use the following technical solutions: According to a first aspect of the embodiments of this application, a stator is provided, including: a stator tooth part, where a plurality of stator tooth parts are arranged at intervals along a circumferential direction; and a stator yoke part, where the stator yoke part is disposed along a circumferential direction of the stator tooth part, and the circumferential direction is a circumferential direction around a central axis of the stator; where the stator tooth part and the stator yoke part are integrally formed from an oriented silicon steel sheet, and a grain direction of the formed oriented silicon steel sheet points to the central axis of the stator along a radial direction, where the radial direction is a straight line direction along a radius or a diameter of the stator. Therefore, the stator tooth part and the stator yoke part are formed by using one material, and there is no need to splice two materials, thereby reducing process costs.

In an optional implementation, the stator further includes: a winding, where the winding is wound in a slot between adjacent stator tooth parts; and the stator uses a fractional slot winding, and a winding pitch is 1. Therefore, the stator uses the fractional slot winding, and the winding pitch is 1, so that a quantity of slots per pole per phase is less than 1, a closing path of a magnetic circuit of the stator is relatively short (that is, a short magnetic circuit structure), and a magnetic field line forms a corner at a position of the stator yoke part, so that an angle between a magnetic field line of the stator yoke part and a grain direction of the oriented silicon steel of the stator yoke part is less than or equal to 45°, thereby improving performance of the oriented silicon steel of the stator yoke part.

In an optional implementation, the stator tooth part includes a first part connected to the stator yoke part and a second part away from the stator yoke part, where a width of the first part along the circumferential direction of the stator is less than a width of the second part along the circumferential direction of the stator. Therefore, by adjusting a size of the second part, an angle between the direction of the magnetic field line and the grain direction of the second part may be reduced, so that an angle between the grain direction of the oriented silicon steel of the second part and the direction of the magnetic field line is less than or equal to 45°, thereby improving performance of the oriented silicon steel of the second part.

In an optional implementation, a ratio of a width of the second part protruding from the first part along the circumferential direction of the stator to a height of the second part along the radial direction of the stator is less than or equal to tan 45°, and a ratio of a width of the second part protruding from the first part along the circumferential direction of the stator to a thickness of the stator tooth part is less than or equal to tan 45°. Therefore, by adjusting a size of the second part, the width of the second part protruding from the first part along the circumferential direction of the stator, the height of the second part along the radial direction of the stator, and the thickness of the stator tooth part can meet the following relationship: The ratio of the width of the second part protruding from the first part along the circumferential direction of the stator to the height of the second part along the radial direction of the stator is less than or equal to tan 45°, and the ratio of the width of the second part protruding from the first part along the circumferential direction of the stator to the thickness of the stator tooth part is less than or equal to tan 45°. An angle between the direction of the magnetic field line and the grain direction of the second part may be reduced, so that an angle between the grain direction of the oriented silicon steel of the second part and the direction of the magnetic field line is less than or equal to 45°, thereby improving performance of the oriented silicon steel of the second part.

In an optional implementation, a sum of one half of a width of the first part of the stator tooth part along the circumferential direction of the stator and one half of a width of the slot between the adjacent stator tooth parts along the circumferential direction of the stator is less than or equal to a height of the stator yoke part along the radial direction of the stator. Therefore, the stator yoke part can provide enough space for bending the magnetic field line, so that, further, an angle between the magnetic field line of the stator yoke part and the grain direction of the oriented silicon steel of the stator yoke part is less than or equal to 45°, thereby improving performance of the oriented silicon steel of the stator yoke part.

In an optional implementation, the stator tooth part further includes a third part located between the first part and the second part, where one end of the third part is connected to the first part, and the other end is connected to the second part; and the third part extends uniformly from the first part to the second part along the radial direction of the stator. Therefore, by disposing the third part, a change amplitude of the magnetic field line can be reduced, and the angle between the magnetic field line and the grain direction of the second part can be further reduced, so that the angle between the grain direction of the oriented silicon steel of the second part and the direction of the magnetic field line is smaller, thereby further improving performance of the oriented silicon steel of the second part.

According to a second aspect of the embodiments of this application, a stator manufacturing method is provided, including: winding an elongated oriented silicon steel sheet in the shape of a helix around a central axis and sequentially laminating and pressing the elongated oriented silicon steel sheet into a ring shape to form the stator, where the stator includes a stator yoke part and a plurality of stator tooth parts arranged at intervals along a circumferential direction, the stator yoke part is disposed along a circumferential direction of the stator tooth part, and a grain direction of the formed oriented silicon steel sheet faces a center of the ring.

In an optional implementation, before winding an elongated oriented silicon steel sheet in the shape of a helix around a central axis and sequentially laminating and pressing the elongated oriented silicon steel sheet into a ring shape to form the stator, the method further includes: arranging a plurality of slots on the elongated oriented silicon steel sheet to form the stator tooth parts, where after the stator is formed through pressing, openings of the slots all face, or face away from, the central axis of the stator, so that a grain direction of the oriented silicon steel sheet points to the central axis along a radial direction.

In an optional implementation, after winding an elongated oriented silicon steel sheet in a shape of a helix around a central axis and sequentially laminating and pressing the elongated oriented silicon steel sheet into a ring shape to form the stator, the method further includes: arranging a plurality of slots on the stator in the ring shape to form the stator tooth parts; and openings of the slots face or face away from the central axis of the stator, so that a grain direction of the oriented silicon steel sheet points to the central axis along a radial direction.

According to a third aspect of the embodiments of this application, a motor is provided, including a rotor and the stator as described above, where a stator yoke part is disposed, along a circumferential direction of a stator tooth part, around an outer circumference of the stator tooth part or an inner circumference of the stator tooth part; and when the stator yoke part is disposed around the outer circumference of the stator tooth part, the stator is disposed around the outer circumference of the rotor; or when the stator yoke part is disposed around the inner circumference of the stator tooth part, the rotor is disposed around the outer circumference of the stator. Therefore, the motor includes the stator as described above, and the stator has a same effect as that of the foregoing stator. Details are not described herein again.

According to a third aspect of the embodiments of this application, an electric vehicle is provided, including the motor as described above. Therefore, the electric vehicle uses the foregoing motor, and has a same effect as that of the foregoing motor. Details are not described herein again.

DESCRIPTION OF EMBODIMENTS

To make objectives, technical solutions, and advantages of this application more clearly, the following further describes this application in detail with reference to the accompanying drawings.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise stated, "a plurality of" means two or more than two.

In addition, in this application, orientation terms such as "upper" and "lower" are defined relative to an orientation in which a component is schematically placed in the accompanying drawings. It should be understood that these orientation terms are relative concepts and are used for relative description and clarification, and these orientation terms may change accordingly based on changes of the orientations in which the components are placed in the accompanying drawings.

The following explains terms that may appear in the embodiments of this application.

Oriented silicon steel means that grains in the silicon steel sheet are oriented in a specific direction, that is, anisotropic.

Non-oriented silicon steel means that grains in the silicon steel sheet are not arranged oriented in any specific direction, that is, isotropic.

Iron loss: Iron loss refers to a sum of hysteresis loss and eddy current loss per unit mass of a ferromagnetic material in alternating and pulsating magnetic fields (a residual loss can be ignored), and the unit of measure is W/kg (watt/kilogram). A transformer, a generator, and a motor each have an iron loss. The iron loss is one of the energy losses.

The reason is that eddy currents are generated inside the iron core during operation. When an eddy current passes through an iron core, heat energy is generated inside the iron core. This heat energy consumes energy, so it is referred to as an iron loss. Iron losses include a hysteresis loss, an eddy current loss, and a residual loss of a magnetic material.

Magnetic permeability is a physical quantity that represents magnetism of a magnetic medium. Magnetic permeability indicates a resistance to magnetic flux or a capability of conducting a magnetic field line in a magnetic field after current flows through a coil in a space or a magnetic core space.

The permeability μ, of the medium meets the following formula:

$$\mu = B/H$$

where H=magnetic field strength, B=magnetic induction strength, and μ is magnetic permeability or is referred to as absolute magnetic permeability.

Fractional slot: A quantity q of slots per pole per phase of a stator is an irreducible proper fraction.

An embodiment of this application provides a motor, where the motor may be a generator, or may be a motor. The motor may be used in an electric vehicle.

It should be noted that the motor may be another type of motor, and the motor may be applied to another device, which all fall within the protection scope of this application.

Figure 1:
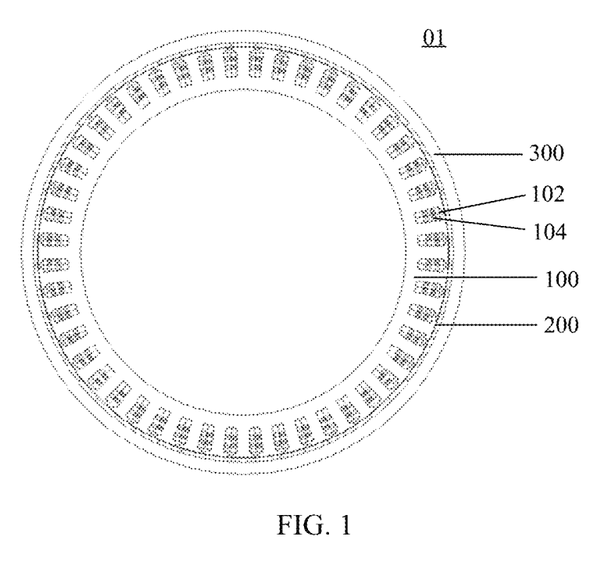
FIG. 1 is a schematic diagram of a structure of a motor according to an embodiment of this application.

FIG. 1 is a schematic diagram of a structure of a motor according to an embodiment of this application. As shown in FIG. 1, the motor 01 includes, for example, a stator 100 and a rotor 300.

For example, the stator 100 is cylindrical, and an axial direction of the stator 100 may be defined as a direction in which a central axis of the stator 100 is located; a circumferential direction of the stator 100 may be defined as a circumferential direction around the central axis of the stator 100, and the circumferential direction is perpendicular to the axial direction; and a radial direction of the stator 100 may be defined as a straight line direction along a radius or a diameter or as a straight line direction perpendicular to the central axis.

In some embodiments, the motor 01 further includes a housing (not shown in the figure), where the housing, for example, is disposed outside the rotor 300 and is disposed around the rotor 300 along the circumferential direction.

For example, the housing encloses a closed cavity, and both the motor stator 100 and the rotor 300 are mounted in the closed cavity. In an axial direction of the stator, a length of the stator 100 and a length of the rotor 300 may be less than a length of the housing of the motor, and two opposite ends of both the stator 100 and the rotor 300 are retracted in the housing of the motor.

For example, the housing includes a first end and a second end, and the two opposite ends of the rotor 300 may be mounted on the first end and the second end by using bearings.

In some embodiments, the stator is disposed around an outer circumference of the rotor, and the structure may be referred to as an outer stator structure.

In some other embodiments, as shown in FIG. 1, the rotor is disposed around an outer circumference of the stator, and the structure may be referred to as an inner stator structure.

When pitches of stator tooth parts are the same, a width of a stator yoke part along a circumferential direction between adjacent stator tooth parts in the inner stator structure is relatively small, and the width is less than a width of a stator yoke part along a circumferential direction between adjacent stator tooth parts in the outer stator structure.

A structure of the stator 100 is not limited in this embodiment of this application. In some embodiments, as shown in FIG. 2, the stator 100 may include a stator tooth part 101 and a stator yoke part 103.

The stator tooth part 101 is formed by a plurality of teeth arranged at intervals along a circumferential direction, and the stator yoke part 103 is disposed around an outer circumference or an inner circumference of the stator tooth part 101.

Figure 2:
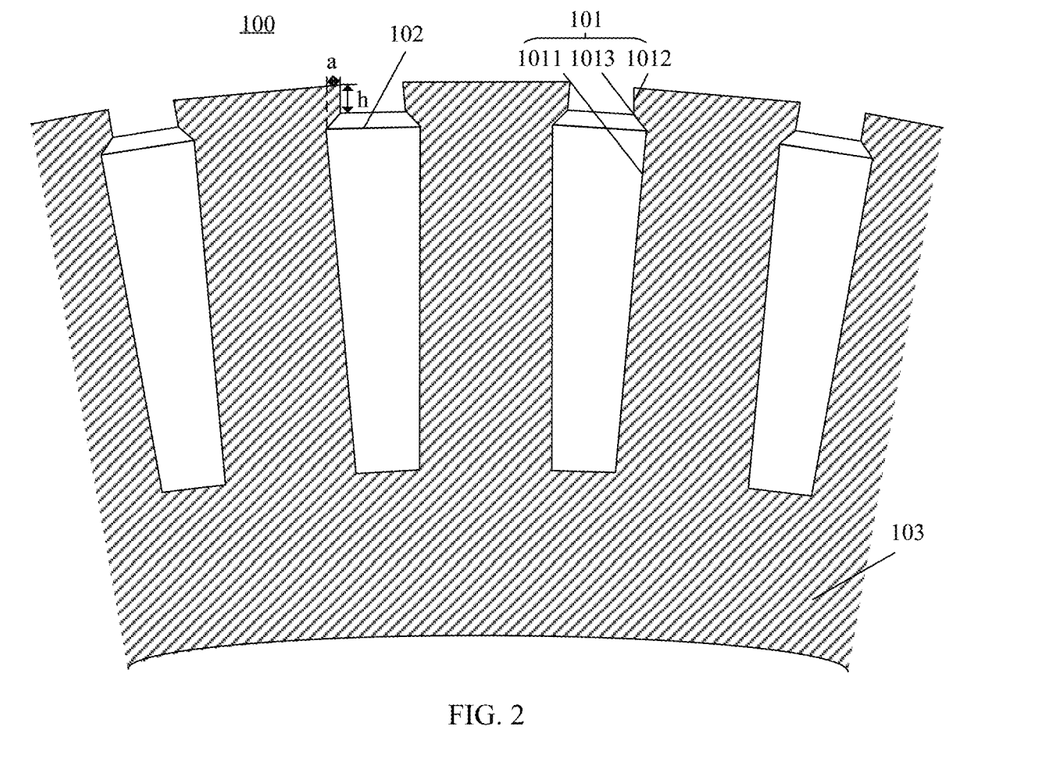
FIG. 2 is a schematic diagram of a structure of a motor stator according to an embodiment of this application.

In some embodiments, as shown in FIG. 2, the stator yoke part 103 is disposed around the inner circumference of the stator tooth part 101. The stator tooth part 101 is formed on an outer side of the stator 100, and may be formed by arranging, on an outer wall of the stator 100, a plurality of slots 102 whose openings are away from a central axis of the stator 100.

The stator yoke part 103 is formed on an inner side of the stator 100. In this case, as shown in FIG. 1, the rotor 300 is disposed around the outer circumference of the stator 100.

Figure 5:
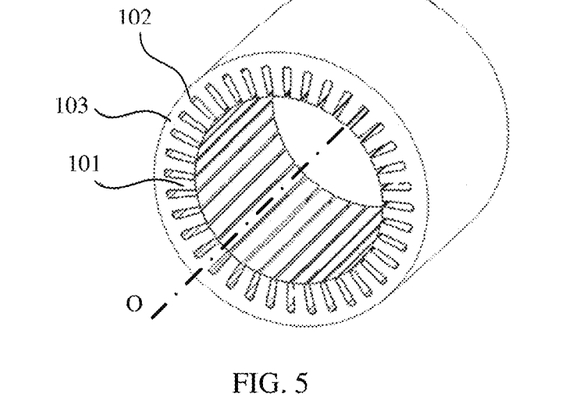
FIG. 5 is a schematic diagram of a structure of another motor stator according to an embodiment of this application.

In some other embodiments, as shown in FIG. 5, the stator yoke part 103 is disposed around the inner circumference of the stator tooth part 101. The stator tooth part 101 is formed on an inner side of the stator 100, and may be formed by arranging, on an inner wall of the stator 100, a plurality of slots 102 whose openings face the central axis O of the stator 100.

The stator yoke part 103 is formed outside the stator 100. In this case, the stator 100 is disposed around the outer circumference of the rotor.

In some embodiments, as shown in FIG. 1, the motor 01 further includes a winding 104.

A structure of the stator winding 104 is not limited in this embodiment of this application. In some embodiments, as shown in FIG. 1, the stator winding 104 may be wound in a slot 102 between adjacent teeth in the stator tooth part 101.

For example, the stator winding 104 is formed by connecting three windings that have a same structure, that are arranged symmetrically, and that are spatially separated by an electrical angle of 120°. Coils of these windings are respectively embedded in the slots of the stator according to a specific rule.

The stator winding 104 is a circuit part of the motor. When three-phase alternating current is connected to the stator winding 104, a rotating magnetic field may be generated, and the rotor 300 may generate high-speed rotation motion when being driven by the rotating magnetic field generated by the stator winding 104.

In some embodiments of this application, the stator tooth part 101 may be formed by using oriented silicon steel, and the stator yoke part 103 may be formed by using non-oriented silicon steel. During processing, the stator tooth part 101 and the stator yoke part 103 need to be formed separately, and the stator tooth part 101 and the stator yoke part 103 need to be spliced together. A processing process is complex, costs are high, and air gaps may be easily generated during splicing, which affects performance of the motor.

Therefore, an embodiment of this application provides an improved stator.

Both the tooth part 101 and the stator yoke part 103 of the stator are made of oriented silicon steel. A magnetization direction (that is, a grain direction) of the oriented silicon steel sheet, for example, faces a center of the stator ring.

During processing, the elongated oriented silicon steel sheet may be encircled along an axial direction and sequentially laminated and pressed into a ring shape, and then a plurality of slots whose openings face the central axis of the stator are arranged on the formed oriented silicon steel sheet.

In some other embodiments, a plurality of openings may be first arranged on the elongated oriented silicon steel sheet, and then the elongated oriented silicon steel sheet is encircled along an axial direction and sequentially laminated and pressed into a ring shape, so that openings of the slots face the central axis of the stator.

Therefore, the stator tooth part 101 and the stator yoke part 103 are formed by using one material, and there is no need to splice the two materials, thereby reducing process costs.

As shown in FIG. 1, a magnetic pole 200 is further disposed between the stator 100 and the rotor 300.

A material of the magnetic pole 200 is not limited in this embodiment of this application. In some embodiments, the magnetic pole 200 uses a permanent magnet, and the material may be ferrite, aluminum nickel cobalt, neodymium iron boron, or the like.

Figure 3:
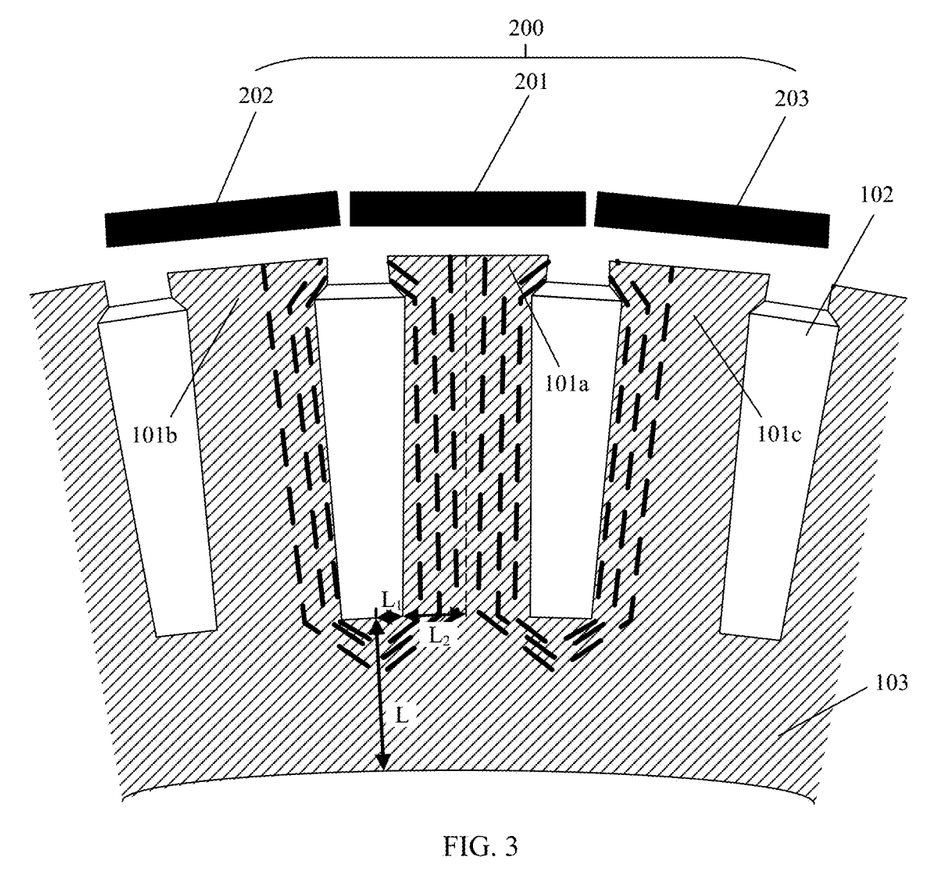
FIG. 3 is a schematic diagram of magnetic field distribution of a motor stator according to an embodiment of this application.

FIG. 3 is a schematic diagram of a distribution of magnetic field lines of the magnetic pole 200 according to this application. As shown in FIG. 3, the magnetic field lines start from a first magnetic pole 201, pass through a stator tooth part 101 and a stator yoke part 103, and return to a second magnetic pole 202 and a third magnetic pole 203.

It should be noted that the first magnetic pole 201 is an N pole, and both the second magnetic pole 202 and the third magnetic pole 203 are S poles.

In this embodiment of this application, both the stator tooth part 101 and the stator yoke part 103 of the stator 100 are made of oriented silicon steel, and a magnetization direction (that is, a grain direction) of the oriented silicon steel faces a center of a stator ring.

It should be noted that when a magnetic field direction is the same as the grain direction of the oriented silicon steel, the oriented silicon steel has the highest magnetic permeability and the lowest iron loss. When an angle between the magnetic field direction and the grain direction of the oriented silicon steel is about 45°, performance of the oriented silicon steel is poor, and the magnetic permeability and iron loss of the oriented silicon steel are close to those of the non-oriented silicon steel. When the angle between the magnetic field direction and the grain direction of the oriented silicon steel is 90°, performance of the oriented silicon steel is extremely poor, and the magnetic permeability and iron loss of the oriented silicon steel are greater than those of the non-oriented silicon steel.

According to FIG. 2, the direction of the magnetic field line in the stator tooth part 101 is basically the same as a grain direction of the stator tooth part 101. In this case, the magnetic permeability of the oriented silicon steel of the stator tooth part 101 is relatively high, and the iron loss is relatively low, and therefore performance of the oriented silicon steel is relatively good.

A magnetic field direction of the magnetic field line in the stator yoke part 103 is different from a grain direction of the stator yoke part 103. In some embodiments, a magnetic circuit of the stator yoke part 103 between adjacent stator tooth parts is relatively long, and a position of the magnetic field line in the stator yoke part 103 is almost perpendicular to the grain direction of the oriented silicon steel of the stator yoke part 103. In this case, the magnetic permeability of the oriented silicon steel of the stator yoke part 103 is relatively low, and the iron loss is relatively high, and therefore performance of the oriented silicon steel is relatively poor.

To improve performance of the oriented silicon steel of the stator yoke part 103, the structure of the stator may be adjusted, so that the angle between the grain direction of the stator yoke part 103 and the magnetic field line is less than or equal to 45°.

The structure of the stator is not limited in this embodiment of this application. In some embodiments, the stator may use a fractional slot winding structure. It is assumed that q is a quantity of slots per pole per phase. When q is an integer, a quantity of slots in each pole pitch of the motor is also an integer.

The total induced electromotive force of each phase is a scalar algebraic sum of the induced electromotive force of each phase in each pair of magnetic poles, or may be described as that the total induced electromotive force of each phase is a product of the induced electromotive force of each phase in each pair of magnetic poles and a quantity p of magnetic pole pairs.

When the quantity q of slots per pole per phase in a motor is a fraction rather than an integer, the winding is referred to as a fractional slot winding. When the fractional slot winding is used, the quantity q of slots per pole per phase may be expressed as follows:

$$q = Z/2pm = b + c/d \qquad \text{Formula (1)}$$

In formula (1), m is a quantity of phases of the motor, Z is a quantity of slots of the stator, p is the quantity of magnetic pole pairs, b is an integer, and c/d is an irreducible proper fraction.

In a three-phase motor, when $q=Z/2pm$ is a fraction, the quantity of slots in each pole pitch in each phase belt is not an integer. Generally, Z and p of a fractional slot motor have a greatest common divisor, that is, $$Z/p = Z_0/p_0 \qquad \text{Formula (2)}$$

In formula (2), $Z=Z_0 t$, and $p=p_0 t$, where t is the greatest common divisor. Therefore, q may be written as formula (3).

$$q = Z_0/2mp_0 \qquad \text{Formula (3)}$$

Formula (3) means that a part corresponding to $p_0$ magnetic pole pairs is considered as a motor with a pair of magnetic poles, the quantity of slots of the motor is $Z_0$, and the quantity of magnetic pole pairs is 1.

In this embodiment of this application, the stator uses, for example, the fractional slot winding, and the winding pitch is 1, so that the quantity of slots per pole per phase is less than 1, and the magnetic circuit of the stator yoke part 103 is relatively short. As shown in FIG. 3, a direction of magnetic field lines of a group of magnetic poles, that is, a magnetic field direction, is used as an example for description.

As shown in FIG. 3, a first magnetic pole 201 is opposite to a first stator tooth part 101a, a second magnetic pole 202 is opposite to a second stator tooth part 101b, and a third magnetic pole 203 is opposite to a third stator tooth part 101c.

Refer to FIG. 3. The magnetic field lines start from the first magnetic pole 201, pass through the first stator tooth part 101a and the stator yoke part 103, and then some of the magnetic field lines pass through the second stator tooth part 101b adjacent to the stator tooth part 101 to return to the second magnetic pole 202, and some other magnetic field lines pass through the third stator tooth part 101c adjacent to the stator tooth part 101 to return to the third magnetic pole 203.

In this embodiment of this application, a fractional slot concentrated winding structure is used. A magnetic field line passes through the first stator tooth part 101a to the second stator tooth part 101b and the third stator tooth part 101c that are adjacent to the first stator tooth part 101a. Because a magnetic circuit of the stator yoke part 103 between the adjacent stator tooth parts is relatively short, the magnetic field line forms a corner at a position of the stator yoke part 103. In addition, because a tangential magnetic resistance of the stator yoke part 103 is relatively high and a radial magnetic resistance of the stator yoke part 103 is relatively low, the magnetic field line of the stator yoke part tends to pass in a direction of a relatively low magnetic resistance, so that an angle between the magnetic field line of the stator yoke part 103 and a grain direction of the stator yoke part 103 is less than or equal to 45°. In this case, the oriented silicon steel of the stator yoke part 103 has relatively high magnetic permeability and a relatively low iron loss, and therefore has good performance.

Therefore, in this embodiment of this application, the fractional slot concentrated winding structure is used, so that the angle between the magnetic field line of the stator yoke part 103 and the grain direction of the oriented silicon steel of the stator yoke part 103 is less than or equal to 45°, thereby improving performance of the oriented silicon steel of the stator yoke part 103.

In addition, to enable the stator yoke part 103 to have enough space so that the angle between the magnetic field line and the grain direction is less than or equal to 45°, as shown in FIG. 3, a sum of one half of a width of the stator tooth part 101 along the circumferential direction of the stator (that is, $L_1$ in FIG. 3) and one half of a width of the slot 102 between the adjacent stator tooth parts along the circumferential direction of the stator (that is, $L_2$ in FIG. 3) may be less than or equal to a height of the stator yoke part 103 along the radial direction of the stator (that is, L in FIG. 3).

Therefore, the stator yoke part 103 can provide enough space for bending the magnetic field line, so that the angle between the magnetic field line of the stator yoke part 103 and the grain direction of the stator yoke part 103 of the oriented silicon steel is less than or equal to 45°, thereby improving performance of the oriented silicon steel of the stator yoke part 103.

A specific structure of the stator tooth part is not limited in this application. In some embodiments of this application, as shown in FIG. 2 and FIG. 4, the stator tooth part 101 includes a first part 1011 (a tooth body) that is connected to the stator yoke part 103 and a second part 1012 (a tooth crown) that is away from the stator yoke part 103.

A width of the first part 1011 along the circumferential direction of the stator is less than a width of the second part 1012 along the circumferential direction of the stator.

Therefore, the second part 1012 protrudes from the first part 1011 along the circumferential direction of the stator, so that the stator winding 104 can be clamped in the slot 102 between the stator tooth parts 101 to prevent the stator winding 104 from falling out of the slot 102.

Figure 4:
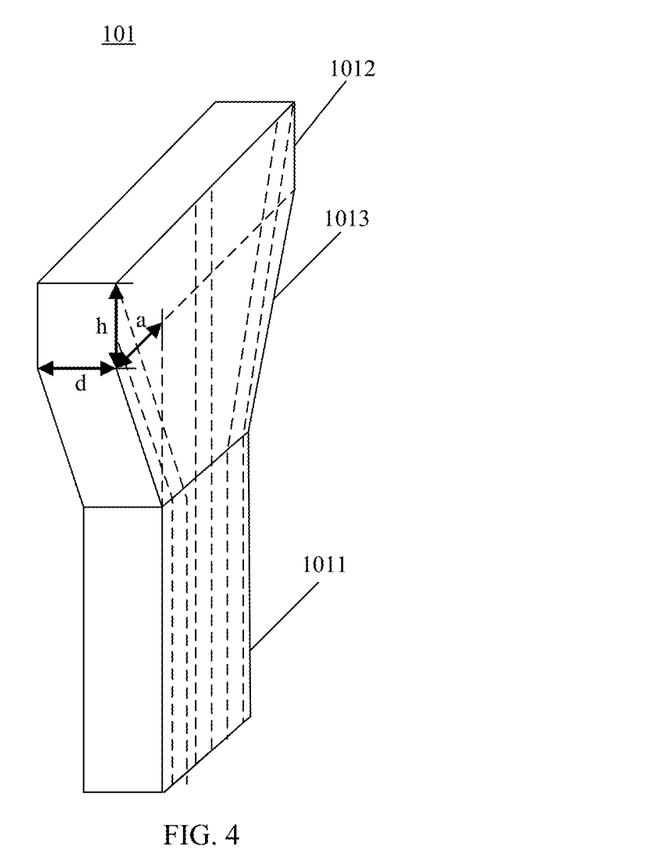
FIG. 4 is a schematic diagram of a structure of a stator tooth part according to an embodiment of this application.

As shown in FIG. 4, in the first part 1011 of the stator tooth part 101, a grain direction is the same as a direction of a magnetic field line, and the oriented silicon steel has the highest magnetic permeability and the lowest iron loss, and therefore the oriented silicon steel has the best performance.

At a position where the second part 1012 of the stator tooth part 101 protrudes from the first part 1011, the direction of the magnetic field line is deflected along the circumferential direction of the stator, so that there is an angle between the direction of the magnetic field line and the grain direction (which points to a central axis along a radial direction).

To improve performance of the oriented silicon steel in the first part and the second part, it is necessary to adjust a structure of the stator tooth part 101.

As shown in FIG. 4, a width of the second part 1012 protruding from the first part 1011 along the circumferential direction of the stator is denoted as a, a height of the second part 1012 along the radial direction of the stator is denoted as h, and a thickness of the stator tooth part 101 is denoted as d.

A ratio of the width a of the second part 1012 protruding from the first part 1011 along the circumferential direction of the stator to the height h of the second part 1012 along the radial direction of the stator can be made to be less than or equal to tan 45°, and a ratio of the width a of the second part 1012 protruding from the first part 1011 along the circumferential direction of the stator to the thickness d of the stator tooth part 101 can be made to be less than or equal to tan 45°.

Therefore, by adjusting the size of the second part 1012, the angle between the direction of the magnetic field line and the grain direction of the second part 1012 can be reduced, so that the angle between the grain direction of the oriented silicon steel of the second part 1012 and the direction of the magnetic field line is less than or equal to 45°, thereby improving performance of the oriented silicon steel of the second part 1012.

In some other embodiments of this application, as shown in FIG. 2 and FIG. 4, the stator tooth part 101 further includes a third part 1013 (a tooth shoulder) connecting the first part 1011 and the second part 1012. One end of the third part 1013 is connected to the first part 1011, and the other end is connected to the second part 1012.

The third part 1013 extends uniformly from the first part 1011 to the second part 1012 along the radial direction of the stator. As shown in FIG. 4, the third part 1013 is uniformly widened from the first part 1011 to the second part 1012, so that the magnetic field line starts to deflect from the third part 1013 and changes uniformly along the third part 1013.

Therefore, by disposing the third part 1013, a change amplitude of the magnetic field line can be reduced, and the angle between the magnetic field line and the grain direction of the second part 1012 can be further reduced, so that the angle between the grain direction of the oriented silicon steel of the second part 1012 and the direction of the magnetic field line is smaller, thereby further improving performance of the oriented silicon steel of the second part 1012.

Figure 6:
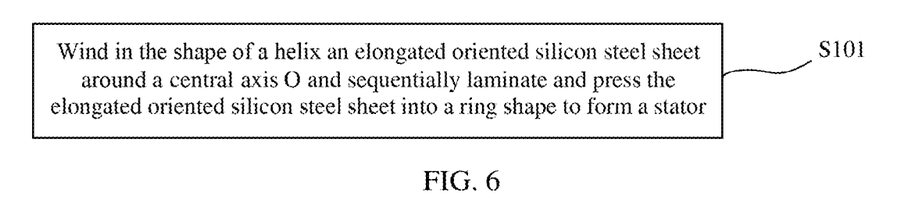
FIG. 6 is a flowchart of a motor stator manufacturing method according to an embodiment of this application.

An embodiment of this application further provides a stator manufacturing method. FIG. 6 shows a stator manufacturing method according to an embodiment of this application. As shown in FIG. 6, the method includes the following step:

S101: Wind an elongated oriented silicon steel sheet in the shape of a helix around a central axis and sequentially laminate and press the elongated oriented silicon steel sheet into a ring shape to form a stator shown in FIG. 7.

Figure 7:
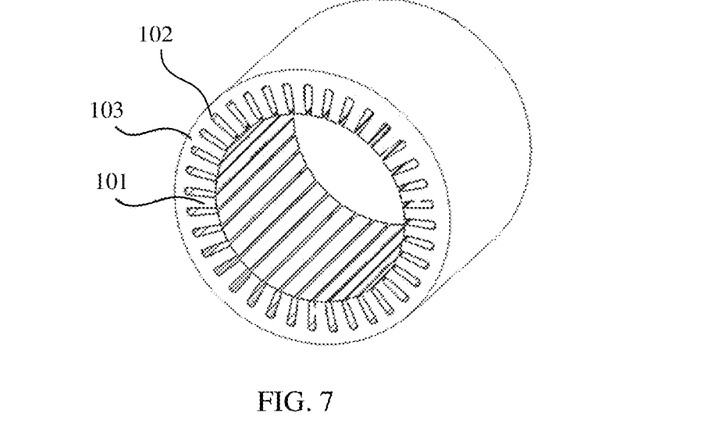
FIG. 7 is a schematic diagram of a structure of a product obtained after steps in FIG. 6 are performed.

The stator 100 includes a stator yoke part 103 and a plurality of stator tooth parts 101 arranged at intervals along a circumferential direction, where the stator yoke part 103 is disposed along a circumferential direction of the stator tooth part 101.

It should be noted that a magnetization direction of the formed oriented silicon steel sheet faces a center of the ring.

In some embodiments, the stator yoke part 103 is disposed around an inner circumference of the stator tooth part 101. The stator tooth part 101 is formed on an outer side of the stator 100, and may be formed by arranging, on an outer wall of the stator 100, a plurality of slots 102 whose openings are away from a central axis of the stator 100.

In some other embodiments, as shown in FIG. 7, the stator yoke part 103 is disposed around an inner circumference of the stator tooth part 101. The stator tooth part 101 is formed on an inner side of the stator 100, and may be formed by arranging, on an inner wall of the stator 100, a plurality of slots 102 whose openings face the central axis of the stator 100.

In this embodiment, the stator tooth part 101 and the stator yoke part 103 are formed by using one material, and there is no need to splice two materials, thereby reducing process costs.

A manufacturing method of the stator is not limited in this embodiment of this application. In some embodiments of this application, a slot may be first disposed on an elongated oriented silicon steel sheet to form a stator tooth part, and the oriented silicon steel sheet on which the slot is disposed is pressed into a stator in a ring shape.

Figure 8:
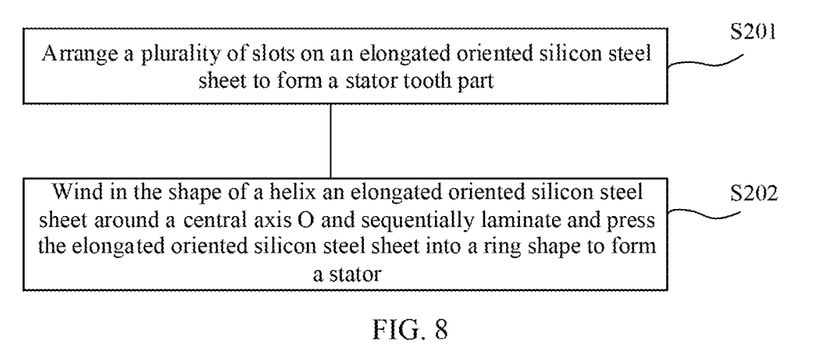
FIG. 8 is a flowchart of another motor stator manufacturing method according to an embodiment of this application.

FIG. 8 shows another stator manufacturing method according to an embodiment of this application. As shown in FIG. 8, the method includes the following steps.

Figure 9:
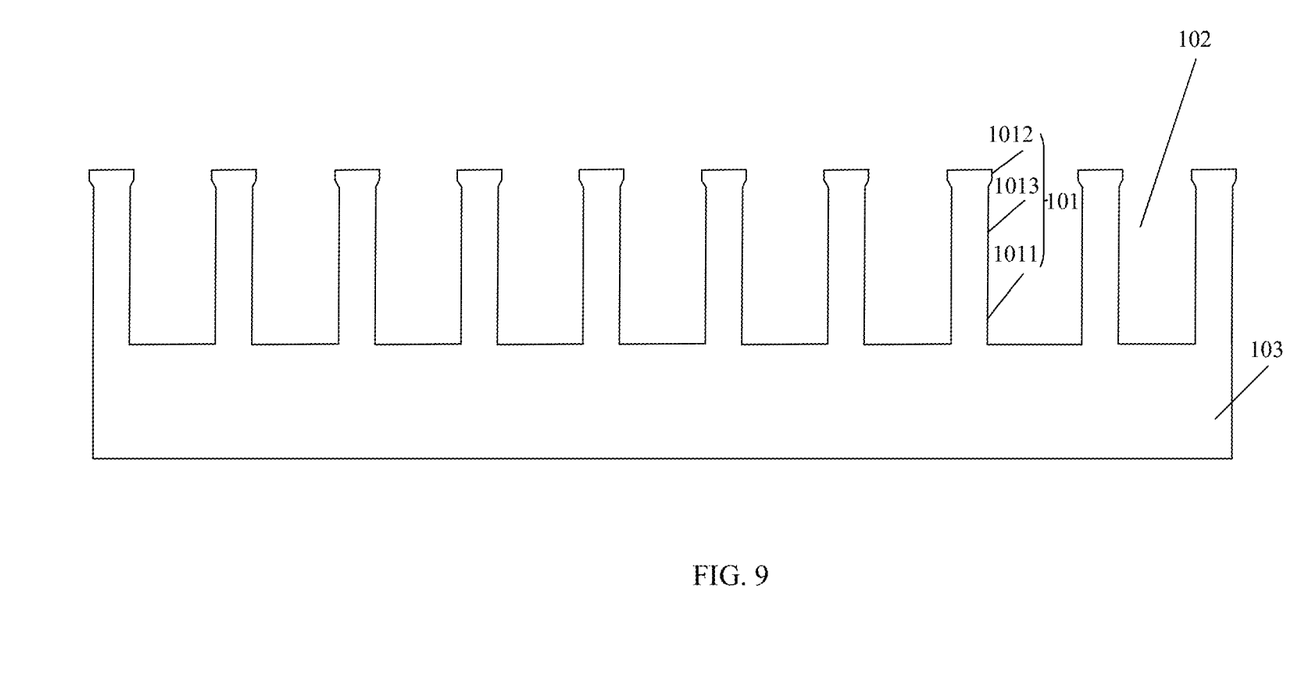
FIG. 9 and FIG. 10 are schematic diagrams of a structure of a product obtained after steps in FIG. 8 are performed.

S201: As shown in FIG. 9, arrange a plurality of slots 102 on an elongated oriented silicon steel sheet to form a stator tooth part 101.

Openings of the slots 102 face the same direction. The stator tooth part 101 includes a first part 1011 (a tooth body) that is connected to the stator yoke part 103, a second part 1012 (a tooth crown) that is away from the stator yoke part 103, and a third part 1013 (a tooth shoulder) connecting the first part 1011 and the second part 1012.

A width of the first part 1011 along the circumferential direction of the stator is less than a width of the second part 1012 along the circumferential direction of the stator. Therefore, the second part 1012 protrudes from the first part 1011 along the circumferential direction of the stator, so that a stator winding 104 can be clamped in the slot 102 between the stator tooth parts 101 to prevent the stator winding 104 from falling out of the slot 102.

Refer to the foregoing embodiment. When a size of the second part 1012 meets a preset value, an angle between the direction of the magnetic field line and the grain direction of the second part 1012 may be reduced, so that an angle between the grain direction of the oriented silicon steel of the second part 1012 and the direction of the magnetic field line is less than or equal to 45°, thereby improving performance of the oriented silicon steel of the second part 1012.

The third part 1013 may reduce a change amplitude of the magnetic field line, and further reduce the angle between the magnetic field line and a grain direction of the second part 1012, so that the angle between the grain direction of the oriented silicon steel of the second part 1012 and the direction of the magnetic field line is smaller, thereby further improving performance of the oriented silicon steel of the second part 1012.

Figure 10:
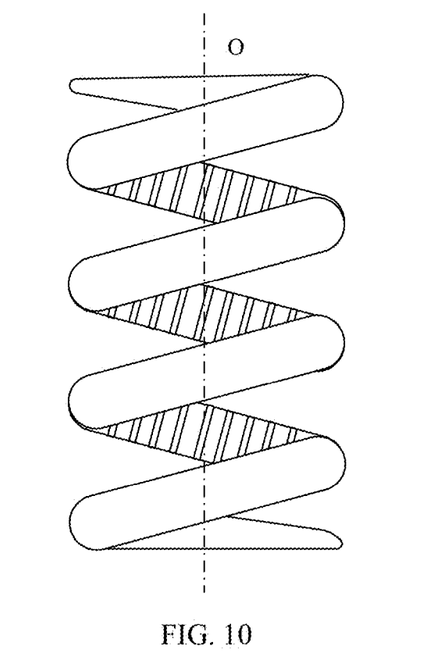

S202: As shown in FIG. 10, wind the elongated oriented silicon steel sheet in the shape of a helix around an axial direction and sequentially laminate and press the elongated oriented silicon steel sheet to form a stator shown in FIG. 7.

After the stator is formed through pressing, openings of the slots 102 all face the central axis of the stator.

In some other embodiments of this application, a sequence of the foregoing step S201 and step S202 may be adjusted. Step S202 may be first performed, and then step S201 is performed; that is, the oriented silicon steel is first pressed into a ring shape, and slots are arranged on the ring to form the stator tooth part. The obtained stator structures are the same, which all fall within the protection scope of this application.

Figure 11:
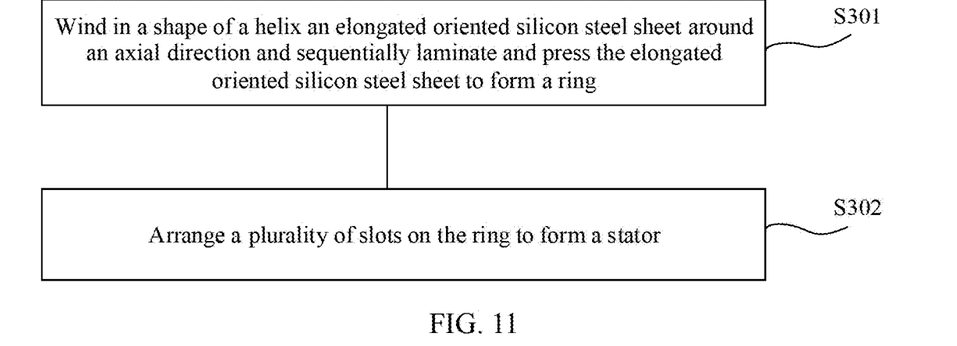
FIG. 11 is a flowchart of another motor stator manufacturing method according to an embodiment of this application.
Figure 12:
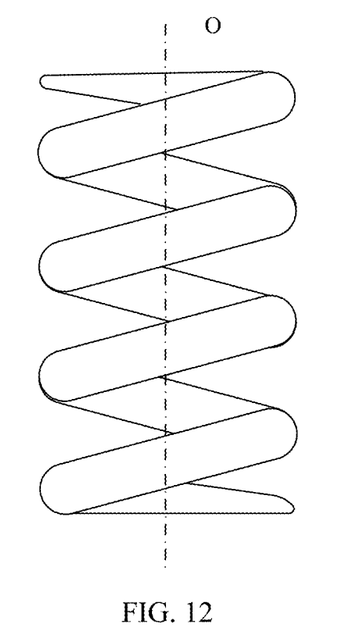
FIG. 12 and FIG. 13 are schematic diagrams of a structure of a product obtained after steps in FIG. 11 are performed.
Figure 13:
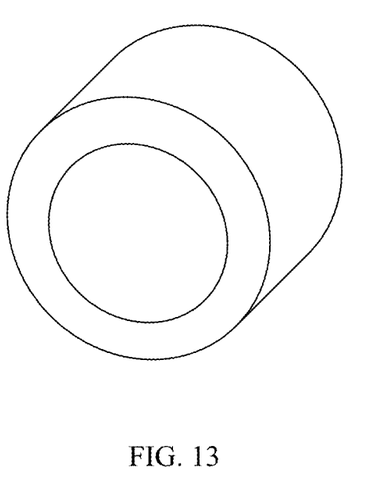

FIG. 11 shows another stator manufacturing method according to an embodiment of this application. As shown in FIG. 11, the method includes the following steps:

S301: As shown in FIG. 12, wind an elongated oriented silicon steel sheet in the shape of a helix around a central axis O and sequentially laminate and press the elongated oriented silicon steel sheet into a ring shape shown in FIG. 13.

S302: Arrange a plurality of slots 102 on the ring to form a stator tooth part shown in FIG. 7.

Openings of the slots 102 face the central axis O of the stator.

In some embodiments, the stator further includes a stator winding, where the stator winding may be wound in the slot 102 between adjacent teeth in the stator tooth part.

In some embodiments, the stator may use a fractional slot winding structure, and a winding pitch is 1, so that a quantity of slots per pole per phase is less than 1, a magnetic circuit of the stator yoke part is relatively short, and a magnetic field line may form a corner at a position of the stator yoke part, so that an angle between a magnetic field line of the stator yoke part and a grain direction of the oriented silicon steel of the stator yoke part is less than or equal to 45°, thereby improving performance of the oriented silicon steel of the stator yoke part.

An embodiment further provides an electric vehicle, where the electric vehicle includes but is not limited to a vehicle such as an electric car, an electric bus, and an electric motorcycle. The electric vehicle may include the motor as described above.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A stator, comprising:
   a plurality of stator tooth parts arranged at intervals along a circumferential direction; and
   a stator yoke part disposed along a circumferential direction of the plurality of stator tooth parts, wherein the circumferential direction is a direction around a central axis of the stator; wherein
   the plurality of stator tooth parts and the stator yoke part together have a unitary construction formed from an oriented silicon steel strip wound in the shape of a helix around a central axis and sequentially laminated and pressed into a ring shape, and a grain orientation of the formed oriented silicon steel strip is directed at the central axis of the stator along a radial direction, wherein the radial direction is a straight line direction along a radius of the stator.

2. The stator according to claim 1, further comprising a winding, wherein the winding is wound in a slot between adjacent stator tooth parts of the plurality of tooth parts; and
   the stator has a fractional slot winding, and a winding pitch is 1.

3. The stator according to claim 1, wherein the plurality of stator tooth parts comprise a first part connected to the stator yoke part and a second part away from the stator yoke part; and
   a width of the first part along the circumferential direction of the stator is less than a width of the second part along the circumferential direction of the stator.

4. The stator according to claim 3, wherein a ratio of the width of the second part protruding from the first part along the circumferential direction of the stator to a height of the second part along the radial direction of the stator is less than or equal to tan 45°, and a ratio of the width of the second part protruding from the first part along the circumferential direction of the stator to a thickness of a stator tooth part of the plurality of stator tooth parts is less than or equal to tan 45°.

5. The stator according to claim 3, wherein a sum of one half of the width of the first part of the stator tooth part along the circumferential direction of the stator and one half of a width of the slot between the adjacent tooth parts of the stator along the circumferential direction of the stator is less than or equal to a height of the stator yoke part along the radial direction of the stator.

6. The stator according to claim 3, wherein the stator tooth part further comprises a third part located between the first part and the second part, wherein one end of the third part is connected to the first part, and the other end is connected to the second part; and the third part extends uniformly from the first part to the second part along the radial direction of the stator.

7. A stator manufacturing method, comprising:

winding an elongated oriented silicon steel strip in the shape of a helix around a central axis and sequentially laminating and pressing the elongated oriented silicon steel strip into a ring shape to form a stator, wherein the stator comprises a stator yoke part and a plurality of stator tooth parts arranged at intervals along a circumferential direction, the stator yoke part is disposed along the circumferential direction of the stator tooth parts, and a grain direction of the formed oriented silicon steel strip points to a central axis of the stator along a radial direction; and the radial direction is a straight line direction along a radius of the stator, and the circumferential direction is a circumferential direction around a central axis of the stator.

8. The method according to claim 7, wherein before winding the elongated oriented silicon steel strip along the central axis and sequentially laminating and pressing the elongated oriented silicon steel strip into the ring shape to form the stator, the method further comprises:

arranging a plurality of slots on the elongated oriented silicon steel strip to form the stator tooth part, wherein after the stator is formed through pressing, openings of the slots all face, or face away from, the central axis of the stator.

9. The method according to claim 7, wherein after winding the elongated oriented silicon steel strip along the central axis and sequentially laminating and pressing the elongated oriented silicon steel strip into the ring shape to form the stator, the method further comprises:

arranging a plurality of slots on the stator in the ring shape to form the stator tooth part, wherein openings of the slots face, or face away from, the central axis of the stator.

10. A motor, comprising a rotor and a stator, wherein the stator comprises:

a stator tooth assembly including a plurality of stator tooth parts are arranged at intervals along a circumferential direction; and a stator yoke part disposed along a circumferential direction of the stator tooth assembly, wherein the circumferential direction is a circumferential direction around a central axis of the stator; wherein the stator tooth assembly and the stator yoke part together have a unitary construction formed from an oriented silicon steel strip wound in the shape of a helix around a central axis and sequentially laminated and pressed into a ring shape, wherein a grain direction of the formed oriented silicon steel strip points to the central axis of the stator along a radial direction, wherein the radial direction is a straight line direction along a radius of the stator;

wherein the stator yoke part is disposed, along a circumferential direction of the stator tooth assembly, around an outer circumference of the stator tooth assembly or an inner circumference of the stator tooth assembly; and when the stator yoke part is disposed around the outer circumference of the stator tooth assembly, the stator is sleeved onto an outer circumference of the rotor; or when the stator yoke part is disposed around the inner circumference of the stator tooth assembly, the rotor is sleeved onto an outer circumference of the stator.

11. The motor according to claim 10, further comprising a winding winding that is wound in a slot between adjacent stator tooth parts; and the stator uses a fractional slot winding, and a winding pitch is 1.

12. The motor according to claim 10, wherein the stator tooth assembly comprises a first part connected to the stator yoke part and a second part away from the stator yoke part; and a width of the first part along the circumferential direction of the stator is less than a width of the second part along the circumferential direction of the stator.

13. The method according to claim 7, wherein the elongated oriented silicon steel strip, prior to winding in the shape of the helix, comprises a strip characterized by a long axis aligned with a length of the strip and a width perpendicular to the length, wherein the grain direction along the length of the strip is oriented parallel to the width.

* * * * *

UNITED STATES PATENT AND TRADEMARK OFFICE
CERTIFICATE OF CORRECTION

PATENT NO. : 11,888,350 B2
APPLICATION NO. : 17/680616
DATED : January 30, 2024
INVENTOR(S) : Ji Pang et al.

It is certified that error appears in the above-identified patent and that said Letters Patent is hereby corrected as shown below:

In the Claims

In Column 14, Line 8, in Claim 10, delete "parts are arranged" and insert -- parts arranged --.

In Column 14, Line 33, in Claim 11, delete "winding winding" and insert -- winding --.

Signed and Sealed this
Twenty-sixth Day of March, 2024

Katherine Kelly Vidal
*Director of the United States Patent and Trademark Office*